United States Patent [19]
Hanson

[11] Patent Number: 5,865,111
[45] Date of Patent: Feb. 2, 1999

[54] BERRY DEHULLING MACHINE

[76] Inventor: Douglas R. Hanson, 1720 9th Ave. South, Anoka, Minn. 55303

[21] Appl. No.: 785,877

[22] Filed: Jan. 21, 1997

[51] Int. Cl.⁶ .......................... A23N 15/00; A23N 15/02; A23N 15/04; A23N 15/08
[52] U.S. Cl. .............................. 99/637; 99/546; 99/635; 99/642; 99/643
[58] Field of Search ................. 56/329; 99/537–540, 99/542–546, 550, 549, 557, 564, 591–594, 491, 635–643; 198/386, 367, 384; 426/482–485; 414/421, 414, 508, 607

[56] References Cited

U.S. PATENT DOCUMENTS

| | | | |
|---|---|---|---|
| 1,835,190 | 12/1931 | Stansbury | 99/640 |
| 2,323,668 | 7/1943 | Morgan | 99/640 |
| 2,552,613 | 5/1951 | Aker | 99/637 |
| 2,617,461 | 11/1952 | Bach | 99/643 |
| 2,710,636 | 6/1955 | Kelly | 99/539 |
| 4,476,778 | 10/1984 | Clyma | 99/546 X |
| 4,658,714 | 4/1987 | McIlvain et al. | 99/637 |
| 5,277,107 | 1/1994 | Turatti | 99/638 |
| 5,590,591 | 1/1997 | Kim | 99/544 |

Primary Examiner—Timothy F. Simone
Attorney, Agent, or Firm—Westman, Champlin & Kelly

[57] ABSTRACT

A strawberry dehulling machine which provides for manually placing a berry or other fruit onto a retainer that will close under a controlled spring action and retain the berry or other fruit with the hull or calyx in an opening formed in the retainer. A rotating cutter removes the hull as the retained berry or other fruit is moved over the cutter for dehulling the berry or fruit. Once the dehulled berry is moved past the cutter, the retainer will be opened and the berry removed either manually or by using an air jet or other mechanical member.

19 Claims, 13 Drawing Sheets

Fig. 7

BERRY DEHULLING MACHINE

BACKGROUND OF THE INVENTION

The present invention relates to an automated fruit dehulling machine, which will permit placing a berry or similar fruit into a carrier, orienting the carrier correctly while it gently contains the berry, and then passing the contained berry, with its hull or calyx exposed to the exterior of the carrier, over a cutter which moves the hull or stem in a continuous process. The berry or similar fruit is released after it is past the cutter.

The removing of the hulls or stems of a berry, such as a strawberry, continues to be a manual operation which involves a good bit of labor and expense. The operation involves pulling or cutting the stem manually and also manually sorting the berries. The actual cutting of the stem or hull is very time consuming and has to be done carefully.

SUMMARY OF THE INVENTION

The present invention relates to a continuous, semi automatic process for removing the hulls or stems from fruit or berries, as shown. A fruit or berry retainer is movable from an open position where a berry can manually be placed in the holder with the berry properly oriented relative to an opening or cutaway in the holder, so that when the retainer is closed the hull or calyx of the berry will be exposed.

The berry retainer comprises hinged sections that will open to a flat position. The recess or cutaway is a size to receive the large hull or calyx end of the berry and support the berry in position. The retainer is then folded closed under a spring pressure that is light enough to avoid damaging or bruising the berry. The opening and closing operation is controlled by a cam that normally holds the berry retainer open, and when it reaches a position for dehulling, the cam is released so the holder closes under a light spring pressure.

In a preferred embodiment of the invention, which is shown a second form, the berry retainer is made so that the berry is placed on the retainer with its long axis horizontal, and a counterweight is used for closing the berry retainer with the berry remaining with its long axis horizontal, and when it reaches the position for dehulling, and the cam releases the spring, the spring also actuates a fork which will then move the berry retainer to orient the berry with the hull or calyx downwardly. Thus, in both forms of the invention, the huller or calyx is oriented downwardly and the dehulling operation can take place.

When the folding retainer closes, the recesses align to provide a passage that exposes the hull or calyx to the exterior. After the berry retainer is oriented properly, in the second form of the invention, and as soon as the holder closes in the first form, the holder is moved to pass over a rotating cutter, which moves through the passage or opening in the berry retainer to cut away and remove the hull and trim away the undesired portions from the berry. After the cutting station has been passed, the folding holder will be opened as the cam is again actuated against the light spring pressure, and the berry or other fruit will be removed.

In the second form of the invention, the berry retainer is released so that the berry retainer moves to its position with the long axis of the berry again horizontally, and an opening finger will counteract the counterweight that holds the berry retainer closed in the second form of the invention as the turntable is moving, to open the berry retainer to the same position as that in the first form of the invention, with both portions of the berry retainer generally coplanar.

The berry can be removed manually, a jet of air can be utilized for blowing the berry off the holder, or a bush can be used to remove the berry.

In the second form of the invention, the berry retainer can receive a berry laying on its side, and after the retainer has closed to contain the berry in position with the hull or calyx aligned with or in the passage or opening formed by the retainer, the retainer is rotated to orient the berry so that the hull or calyx extends downwardly for passing over the cutter.

The cutter can take the form of a rotating sharp blade that is motor driven, similar to a wood router, rotating at a high speed, for forming clean cuts for removable of the hull or calyx.

Because the holding action is under a controlled spring pressure, the berries are not bruised. The loading process is manual, so that a sorting operation can take place at the same time.

As shown, a carousel type of support is utilized for rotating the berry retainers from a loading station, to a station where the holder will gently clamp the berry. The passage or openings in the retainers are properly aligned with the cutter, and retainer and the retained berry are passed over the cutter as the carousel rotates to remove the berry hull or calyx. After the removal of the hull or calyx the cam controlling the retainer will again act against the retaining springs and open the retainer so that the berry can be removed.

BRIEF DESCRIPTION OF THE DRAWINGS

Figure 7:
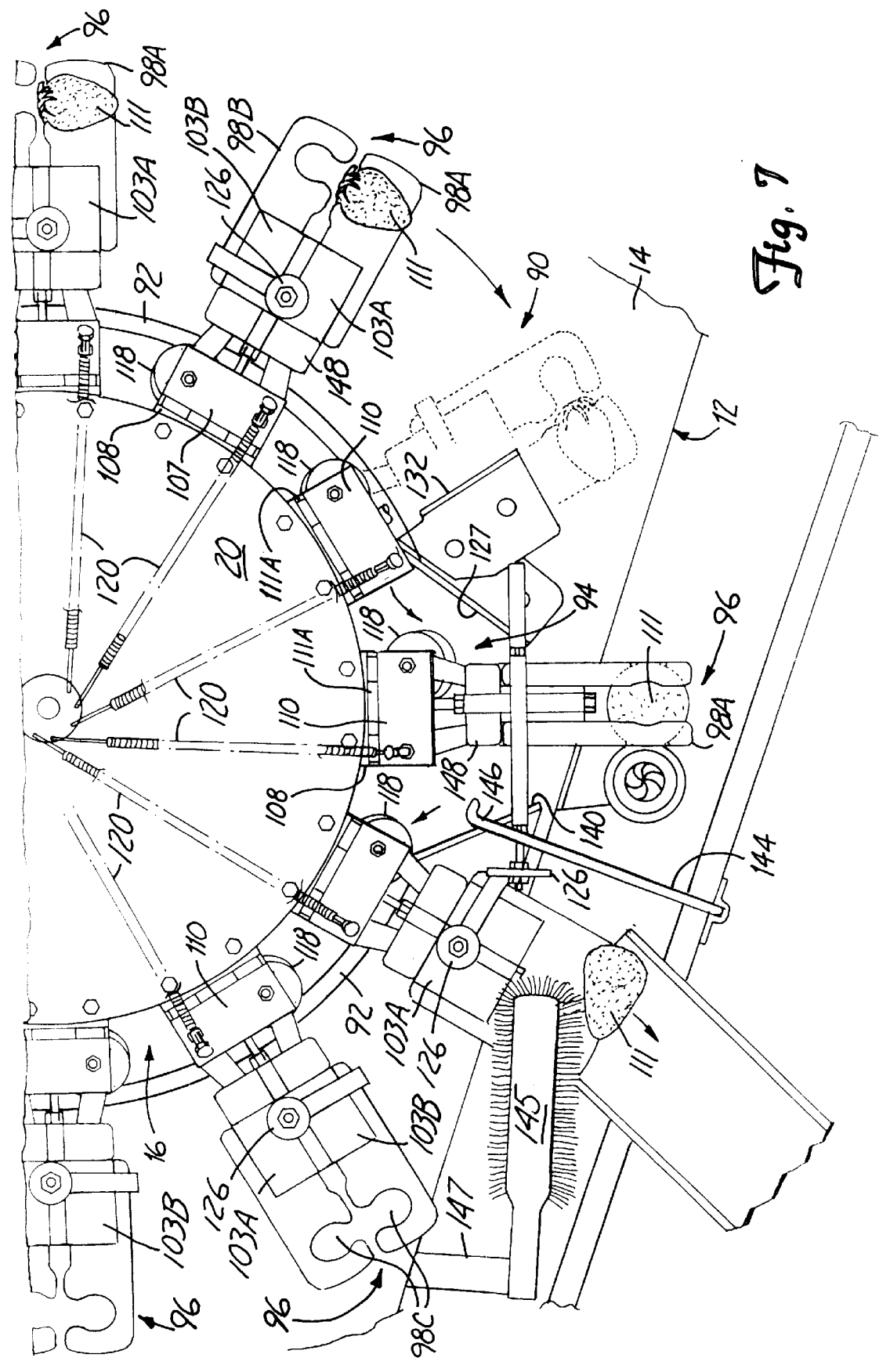

FIG. 7 is a perspective view similar to FIG. 1, but showing a second form of the invention, which permits the berry to be placed with the long axis of the berry horizontal;

DETAILED DESCRIPTION OF THE PREFERRED EMBODIMENTS

Figure 2:
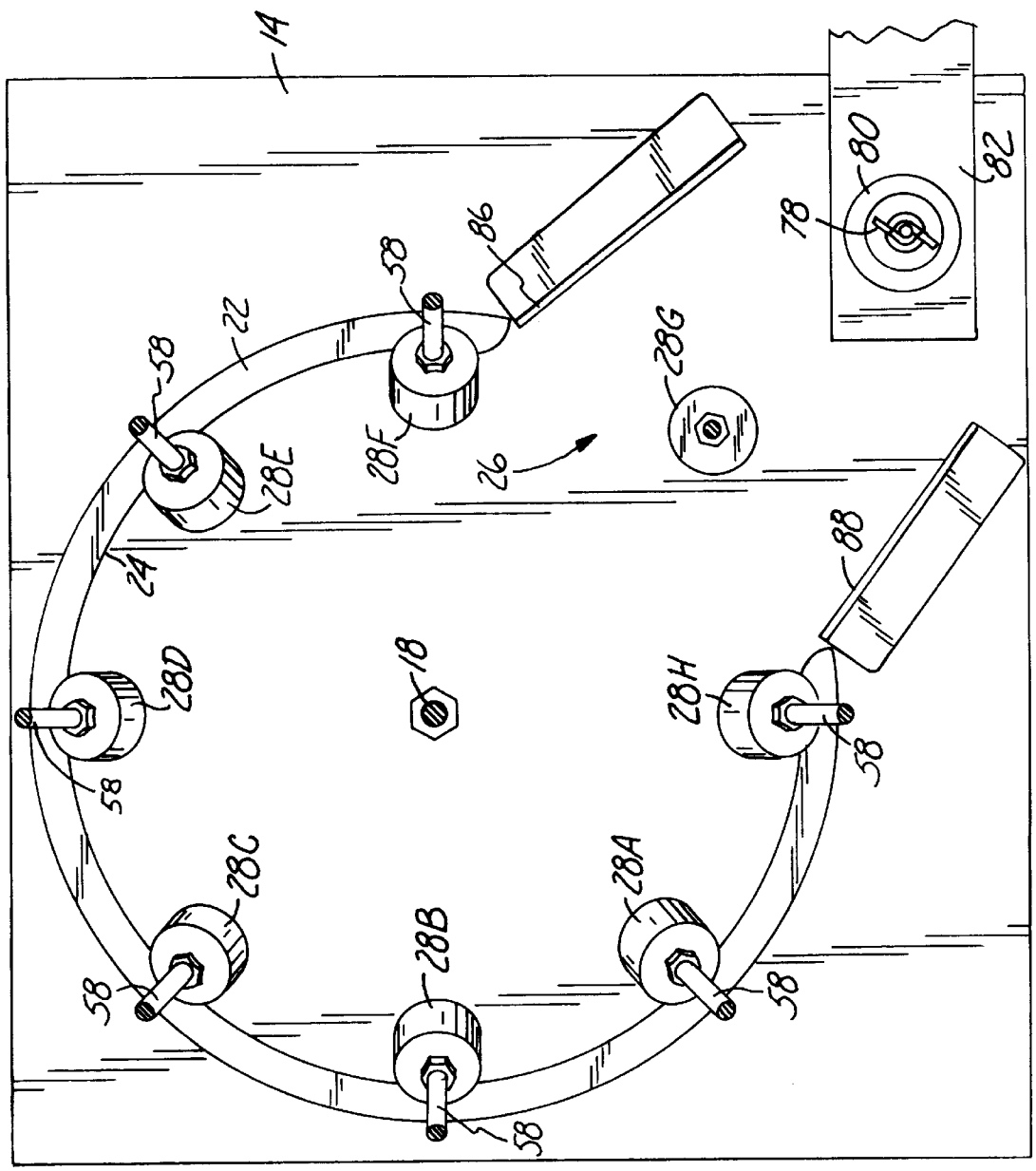
FIG. 2 is a view showing a cam track schematically, which controls operation of berry retainers or holders.
Figure 6:
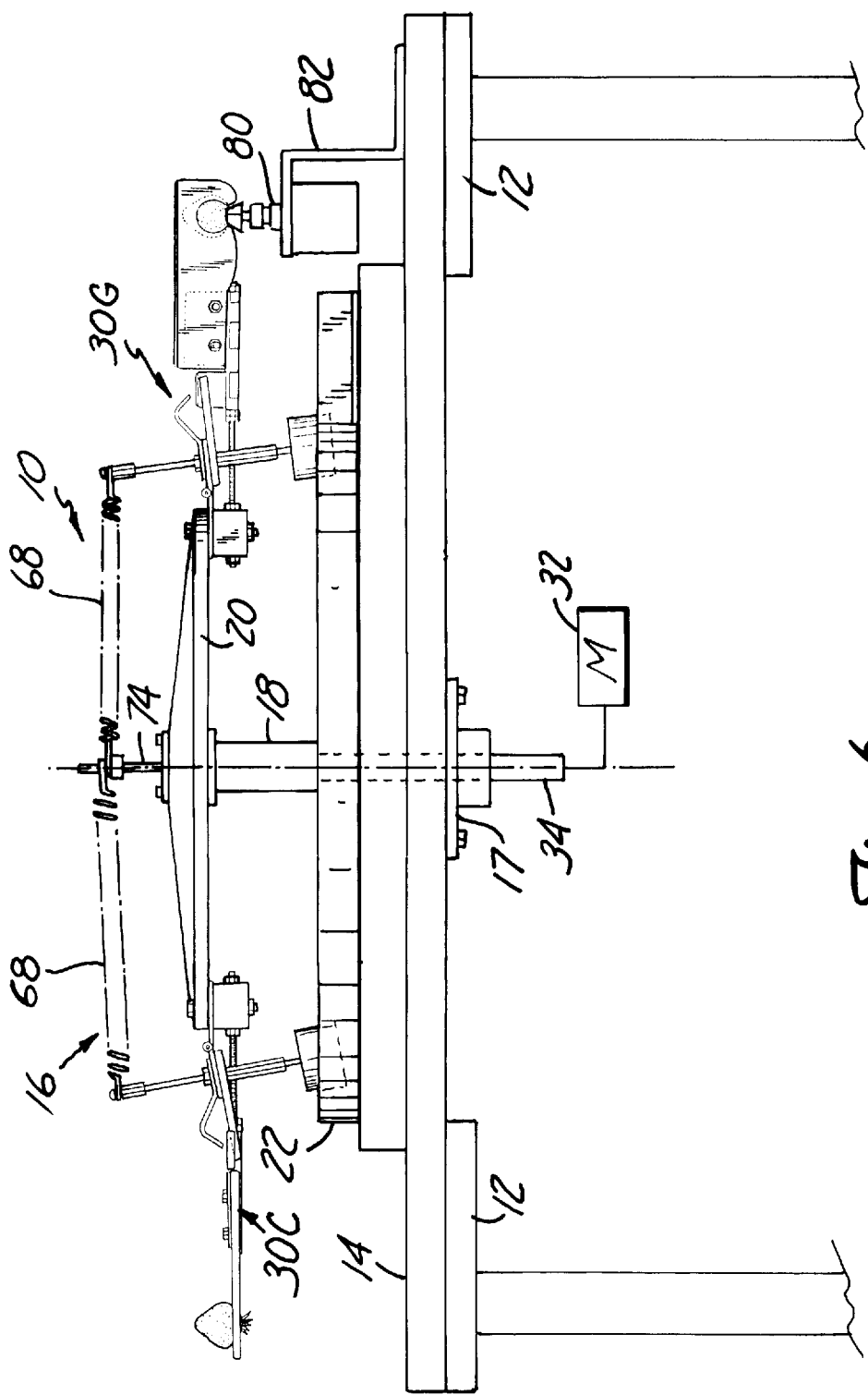
FIG. 6 is a schematic side view of a typical support table having a base plate and cam and showing a drive shaft for operating carousel of the present invention, with some of the berry retainers removed for sake of clarity.

A berry hulling machine indicated generally at 10, as shown in FIG. 6, includes a support table or frame 12, which in turn supports a base plate 14 for the hulling machine. The base plate 14 is made to support a rotating carousel-type plate assembly 16, on a suitable bearing arrangement including a lower bearing 17, and an upper hub and bearing 18 that supports a carousel plate 20 directly. A cam track 22 is mounted on the base plate 14, and is fixed in position. The cam track 22, as shown in FIG. 2 for example, is a part annular track having an interior cam surface 24 that is continuous except for a segment 26 at a cutting station. This will be explained as the description proceeds, but the cam track is used for controlling operation of cam rollers 28A through 28H that are used for controlling berry holders or retainers.

Figure 1:
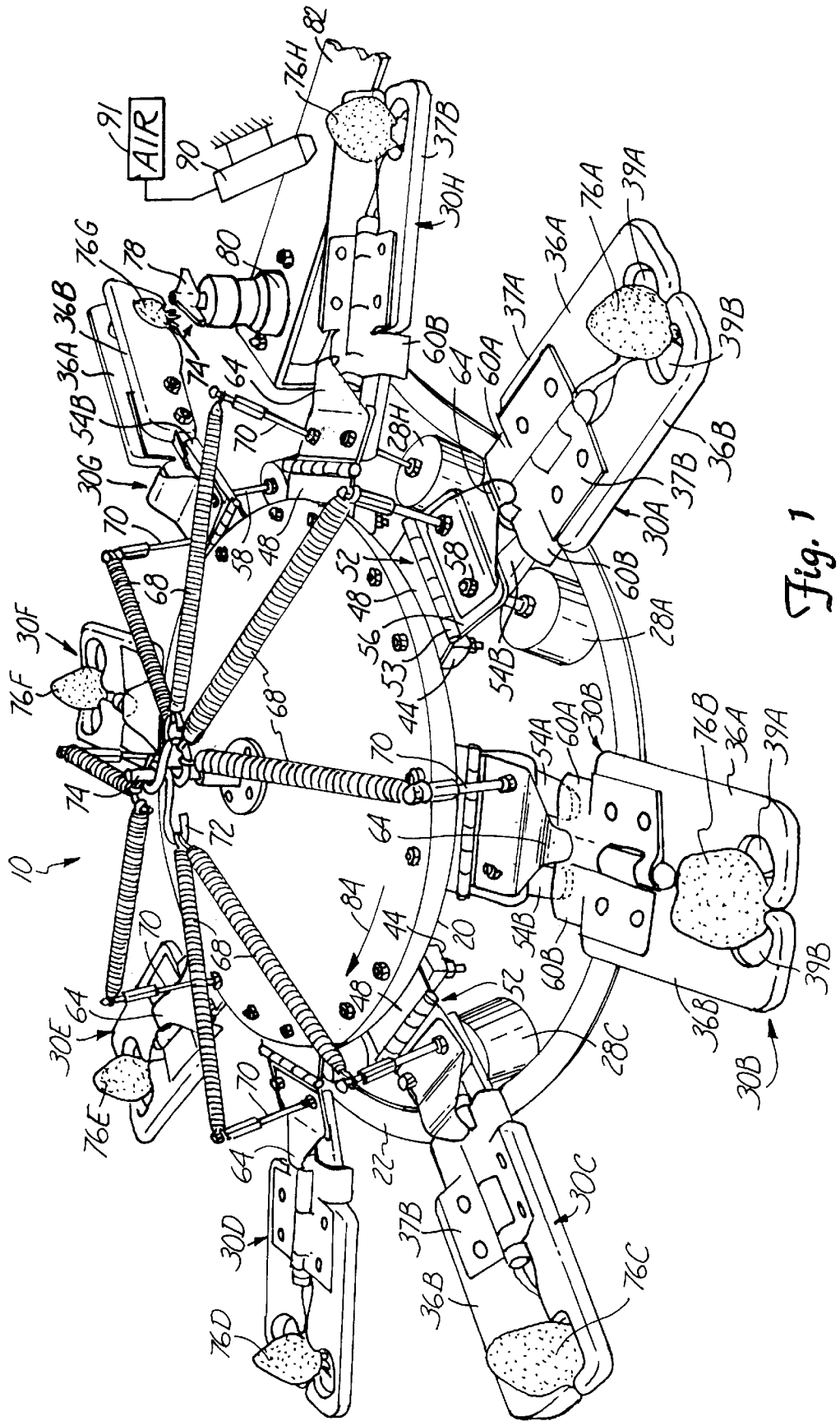
FIG. 1 is a perspective view of a typical berry carrying carousel made according to the present invention.

As shown in FIG. 1, the carousel plate 20 supports eight separate berry retaining assemblies 30A through 30H, and the cam rollers 28A through 28H are corresponding to those holding stations or positions. As the carousel plate 20 is rotated by driving a support shaft 34 with a motor 32. Each of the assemblies 30A through 30H will move in an annular path. The cam rollers will hold the berry retainers 35 in the desired positions. At the cam segment 26, where the cam track is opened, the berry retainers 35 will be released from the cam followers and will fold closed to enclose a berry under a spring pressure.

Figure 3:
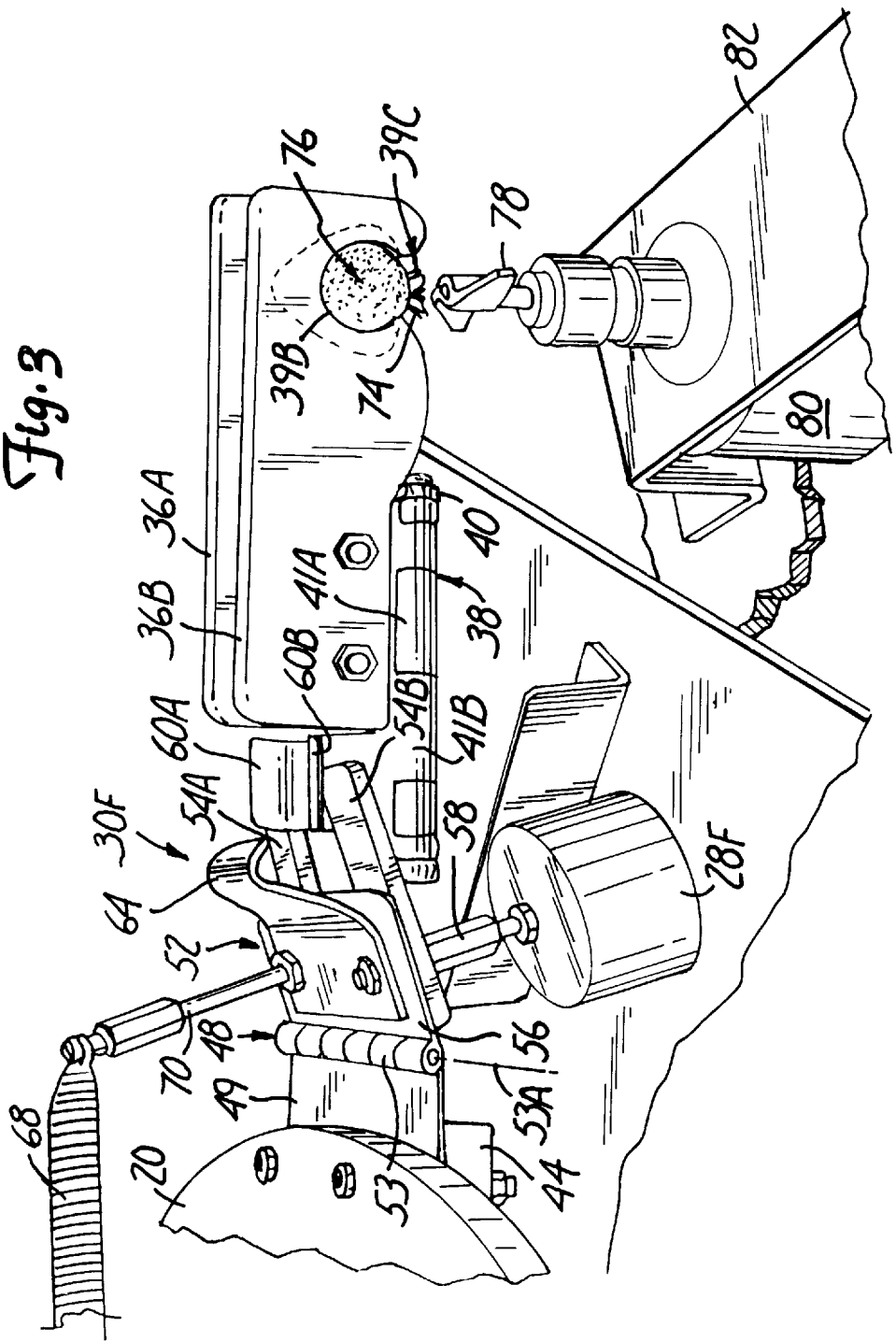
FIG. 3 is a perspective view of a berry being held in a retainer, about to pass over a rotating cutter.
Figure 4:
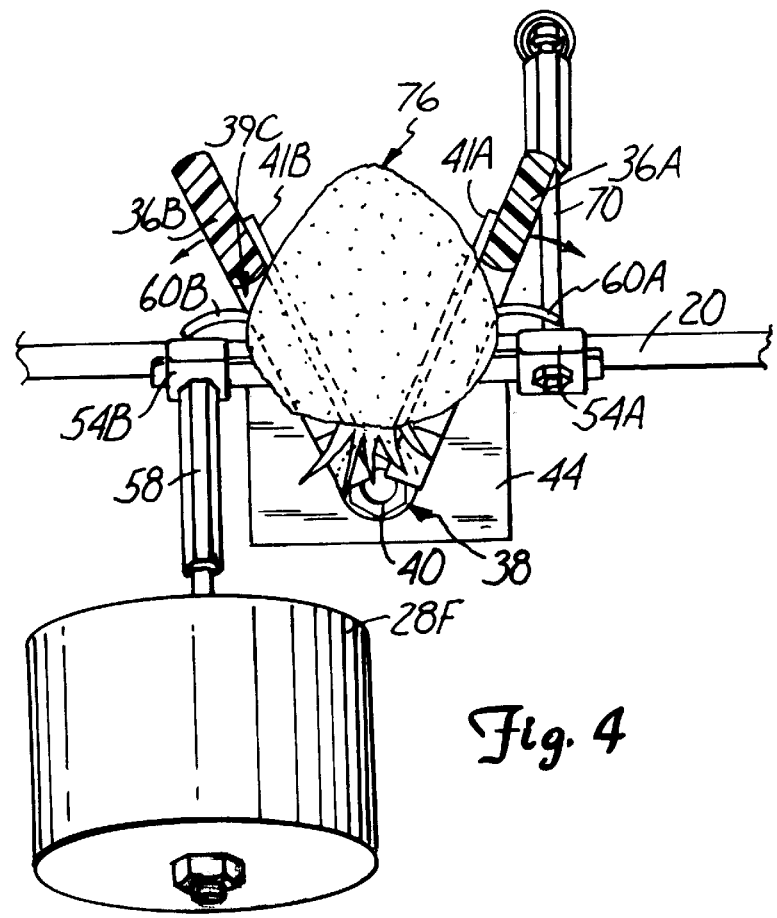
FIG. 4 is a segmentary sectional view taken along lines 4—4 in FIG. 3.
Figure 5:
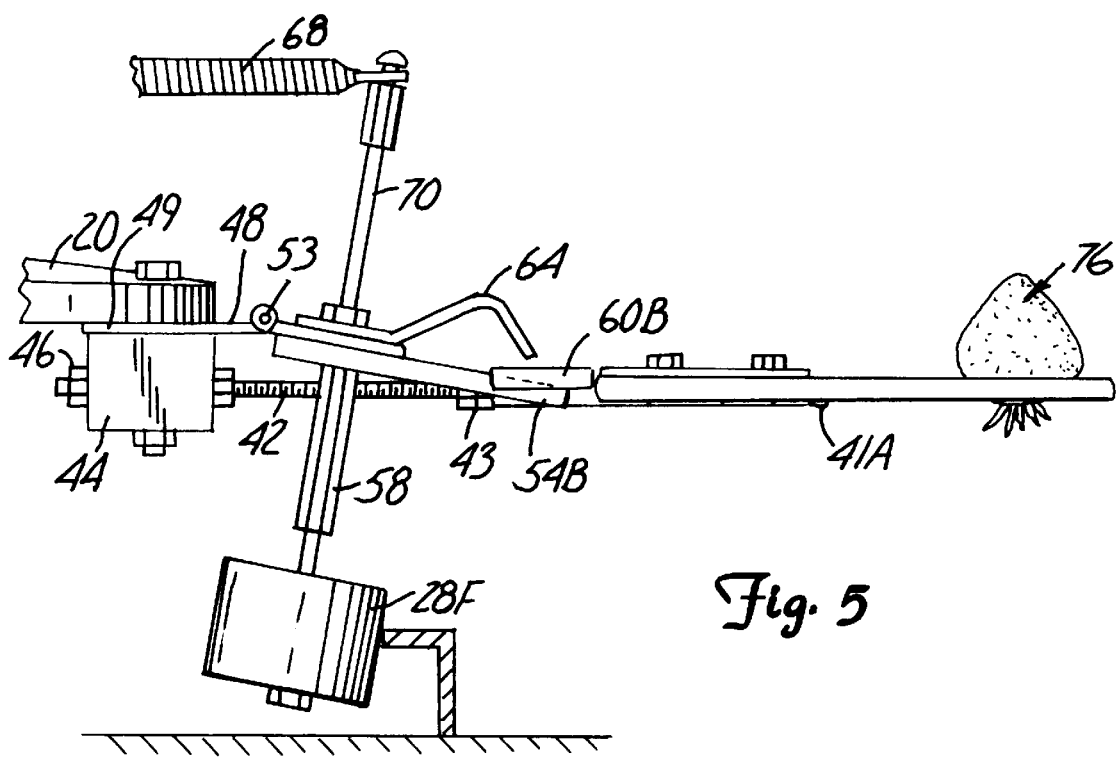
FIG. 5 is a side view of a mounting assembly for the berry retainer on the edge of a carousel plate.

Referring to FIGS. 1 and 3 in particular, assembly 30F is shown, and also in FIGS. 4 and 5, the details of a typical berry retainer or holder 35 are illustrated. Each berry retainer or holder 35 comprises a pair of substantially flat plates 36A and 36B which are formed of a material that is compatible with handling food, such as a suitable plastic, and these berry retainer plates are mounted on a hinge assembly 38. The hinge assembly 38, as shown, has a hinge pin 40, connecting a pair of hinge members 41A and 41B which are fastened to support and secure the plates 36A and 36B together. Hinge pin 40 has an extension support shaft 42 that comprises a threaded rod attached to the hinge pin 40 with suitable lock nuts 43. The threaded rod 42 passes through an opening in a support block 44 and is held in place with suitable lock nuts 46 on opposite sides of the support block. The block 44 in turn is attached to the bottom side of the carousel plate 20 with suitable bolts or screws, and the block is used to clamp and hold a cam operated hinge assembly 48.

It can be seen that the berry retainer plates 36A and 36B are thus supported on the hinge members 41A and 41B independently of the cam operated hinge assembly 48. The hinge axis of hinge pin 40 extends substantially parallel to the carousel plate 20 and radially from the central axis of the shaft 34 that mounts the carousel plate 20.

The cam operated hinge assembly 48 includes a fixed base 49 that is clamped to the underside of the carousel plate 20, and a movable actuator portion 52 that is hingedly connected to the base 49 with a hinge 53. The hinge 53 operates about an axis 53A that is also parallel to the plane of the carousel plate 20, but is on a line substantially tangent to the carousel plate 20 and perpendicular to the axis of the hinge pin 40.

The movable actuator portion 52 is bifurcated to form a pair of fingers 54A and 54B that extend outwardly from the hinge axis 53. The bifurcated fingers 54A and 54B are mounted on a cam actuated plate 56 which has an attached shaft 58 extending therefrom. The shafts 58 are fixed to the respective plate 56 at each hinge assembly 48 and the respective cam rollers 28A through 28H are supported on the shafts 58. Fingers 54A and 54B are positioned on opposite sides of the hinge pin 40, and are positioned below cam follower arms 60A and 60B that are integral with the respective hinge sections 41A and 41B. A berry retainer opener 64 is also mounted on the base plate 56 along with the bifurcated fingers, and is positioned to be above the bifurcated fingers 54A and 54B. The opener 64 is aligned with the cam follower arms 60A and 60B so that in a position such as that shown in FIG. 1 at station 30B, the end of the opener 64 will have then moved downwardly sufficient so that it will ensure that the arms 60A and 60B and the retainer plates 36A and 36B are pivoted to be separated.

In the position shown in FIG. 3, the opener 64 is up out of the way. The cam fingers 54A and 54B have been moved up to a position to urge the arms 60A and 60B upwardly, thereby causing the plates 36A and 36B of the berry retainers 35 to pivot closed about hinge pin 40.

The movement of the fingers 54A and 54B is controlled through a coil spring 68 for each of the stations 32A through 32H. Each spring 68 is attached to a mast or shaft 70 that is fixed to the plate 56 of one of the cam members 52, and the opposite ends of each of the springs 68 is connected through connectors 72 to a central mast 74 that is fixed to and rotates with the carousel plate 20. The mast can be attached in any desired manner, such as by the mast 74 having a flange fixed to the top of the carousel plate 20, or by other means.

Springs 68 control the closing the berry retainers or holders 35 when the respective cam rollers 28A through 28H reach the region 26 of the cam track 22. When the cam rollers are riding on the inside surface 24 of the annular portion of the cam track 22 they will cause the actuator 56 to pivot downwardly to the positions shown at stations 30A through 30H in FIG. 1. The cam rollers and shafts thus overcome the spring force of the respective springs 68 and cause the retainer plates 36A and 36B to open.

Each of the retainer plates 36A and 36B has a base section 37A and 37B respectively, attached to the hinge plates 41A and 41B, and the outer end of the base sections are configured so that there will be clearance for pivoting. The facing edges of the base section are recessed or trimmed back to accommodate the hinge pin 40 and the hubs of the hinge sections which fit around the pin 40. The outer ends of the retainer plates 36A and 36B are provided with beveled recesses 39A and 39B that open to the edge of the respective plate that faces the edge of the other plate. The edge opening of the recess is adjacent the axis of the hinge pin 40. A passage 39C extending completely through both plates 36A and 36B is formed when the berry retainer plates are folded. As shown, the hull or calyx 75 of a strawberry 76 held in the berry retainer will be exposed at this through opening 39C. The opening 39C that extends across both plates of the folded berry retainer is configured to provide clearance for a rotating cutter 78 that is driven by a high speed motor 80, similar to a wood router, and which is mounted onto a support plate 82 that in turn is fixed relative to the table 12.

In the respective stations shown in FIG. 1, the berry retainer plates 36A and 36B are all open or horizontal at stations 30A through 30F.

For example in station 30A, a berry 76A (as shown a strawberry) can be placed into position in the recesses 38A and 38B, and the berries 76A through 76F are all supported in position with the hulls or calyxes aligned with the through opening 39C. The edges of recesses 38A and 38B are beveled sufficiently so that they will support the berry in the appropriate upright position.

The stations where the retainer plates 36A and 36B are open are provided for ensuring that proper loading is made, and any sorting can also take place as the carousel plate 20 rotates in the direction as indicated by the arrow 84. The springs 68 are extended, and the retainer plates 36A and 36B are permitted to open by the cam position.

When a station on the carousel plate 20 approaches the position of station 30G, the cam roller 28G will have moved off the part annular portion of the cam track 22 and will be positioned in the open portion 26 between a cam exit guide 86 and a cam entrance guide 88 that permits the cam rollers to move outwardly, under the loading of the respective spring 68. As the cam roller 28G moves outwardly the corresponding fingers 54A and 54B will be lifted up acting against the arms 60A and 60B to cause the berry retainer plates 36A and 36B to fold closed, gently holding a berry between them and retained in the recesses 38A and 38B with the berry hull or calyx aligned with the through opening 39C. At the station 28B, the berry retainer plates, which are not shown in FIG. 2, will be directly over the rotating cutter 78. As the carousel plate 20 rotates the cutter 85 will pass through the opening 39C that is formed in the retainer plates 36A and 36B and remove the hull or calyx 75 from the berry 76 by cutting it cleanly.

Then, the cam roller 28G will move into engagement with the cam entrance guide 88 that is tapered to cause the roller 28G, and each cam roller in turn, to move inwardly toward the axis 18 of the carousel plate 20, causing the associated spring to extend. The berry retainer opener 64 of that assembly moves to ensure that the retainer plates 36A and 36B will separate so that by the time the station reaches the position of station 30H, the berry that has been dehulled or decalyxed will be released from the retaining action and can be removed.

The processed berry will have a slight recess in its stem end where the cutter passed through as shown at station 30H. Then the berry can be removed manually, or an air jet shown schematically at 90 using compressed air from a source 92 can be used to blow the berry off the open retainer plates and into a suitable container.

The air jet 90 would be mounted to act only at that particular station 30H to dislodge the berry from the retainer plates and move it into a suitable bin or container.

Once the berry is removed, a new berry 76A can be placed manually onto the open retainer plates as the empty stations of the carousel rotate past an operator.

The springs 68 are light enough so the retainer plates operated by the springs will not bruise the berry, and thus they will not injure fingers that might get between the retainer plates at stations 30G either. The retainer plates are not likely to pinch or hurt fingers that get between them.

Referring to the second form and preferred embodiment of the present invention shown in FIGS. 7–14, the carousel arrangement is substantially the same, and comprises a berry hulling machine indicated generally at 90, that includes a support table or frame 12 as in the first form of the invention, which in turn supports a base plate 14 for the hulling machine. The base plate 14 is the same as in the previous form of the invention, and rotates a carousel plate assembly 16 including a rotating plate 20 on a suitable bearing arrangement as shown in the first form of the invention.

Cam track 92 is similar to the track 22. The cam track 92 is fixedly mounted on the base plate 14. Cam track 92 is a part annular track, has an interior cam surface that is continuous except for the open segment shown at 94 in the drawings. The open segment 94 is to permit the operations of the spring loaded assembly berry holder or berry retaining assemblies 96A, 96G, 96D as shown. The berry holders are shown only fragmentarily, but there would be at least eight of the berry holding assemblies as shown in the first form of the invention. Each of the berry holding assemblies 96A–96G that is shown rotates with plate 20, and thus is moved through an annular path utilizing motor 32 shown in the first form of the invention. The berry holding assemblies 96 include berry retainers or berry holders 98 that are oriented in position in this form of the invention under spring pressure and cam followers and also held closed by a counter weight prior to the removal of the hull from the cutter assembly.

Each berry retainer 98, as shown schematically in FIGS. 8–14 comprises a pair of substantially flat inert material retainer plates, such as a suitable plastic that is suitable for handling food. The retainer plates are indicated at 98A and 98B. The retainer plates 98A and 98B are held on a hinge assembly 100 that has a hinge pin 102 connecting hinge members 103A and 103B that are attached to the plates 98A and 98B, respectively. As in the first form of the invention, the hinge pin 102 has an extension shaft that is attached through a suitable mounting block 105 to the carousel plate 20 as shown in the first form of the invention, so that the hinge assembly 100 and the retainer plates 98A and 98B move with the carousel plate 20 as it rotates.

A cam operated hinge assembly 107, as in the first form of the invention, is mounted onto the plate 20 and aligned with the berry holders 98, as in the first form of the invention. The hinge assembly 107 is an actuator that operates independently of the berry holder assemblies 96, and can be hinged relative to the respective berry holder assemblies 96. Each hinge assembly 107 is a cam operated hinge assembly corresponding to the assembly 48, and includes a fixed base 108, that is fixed to the underside of the carousel plate 20, and a hingedly movable actuator portion 110 that is hingedly connected to the base 108 with a hinge pin 11A. The hinge 111A pivots about a horizontal axis, as in the first form of the invention. This horizontal axis is substantially perpendicular to the axis of the hinge pin 102 for the respective berry retainer 98.

The actuator portion 110 of hinge 107 has bifurcated fingers 112 thereon, as in the first form of the invention, which fit underneath cam followers 114 that are formed on the ends of the hinge assemblies. The cam followers 114 are formed on the hinge plate. The cam followers serve a slightly different function than in the first form of the invention as will be explained. Plates 110 are cam actuated and have a cam roller support shaft 116 mounted on the plate, and extending downwardly. A cam roller 118 is rotatably mounted on the lower end of arm 116 and rolls on cam track 92. The cam roller 118 is used for controlling the operation of the berry holder.

A return spring or actuator spring 120 is mounted onto an upright shaft 122 fixed on the actuator portion 110 of the associated hinge assembly 110. As can be seen, the springs 120 are supported on a center post as in the first form of the invention. The posts 122 can be placed on either side of the actuator portions as desired, for adequate clearance and timing.

Figure 8:
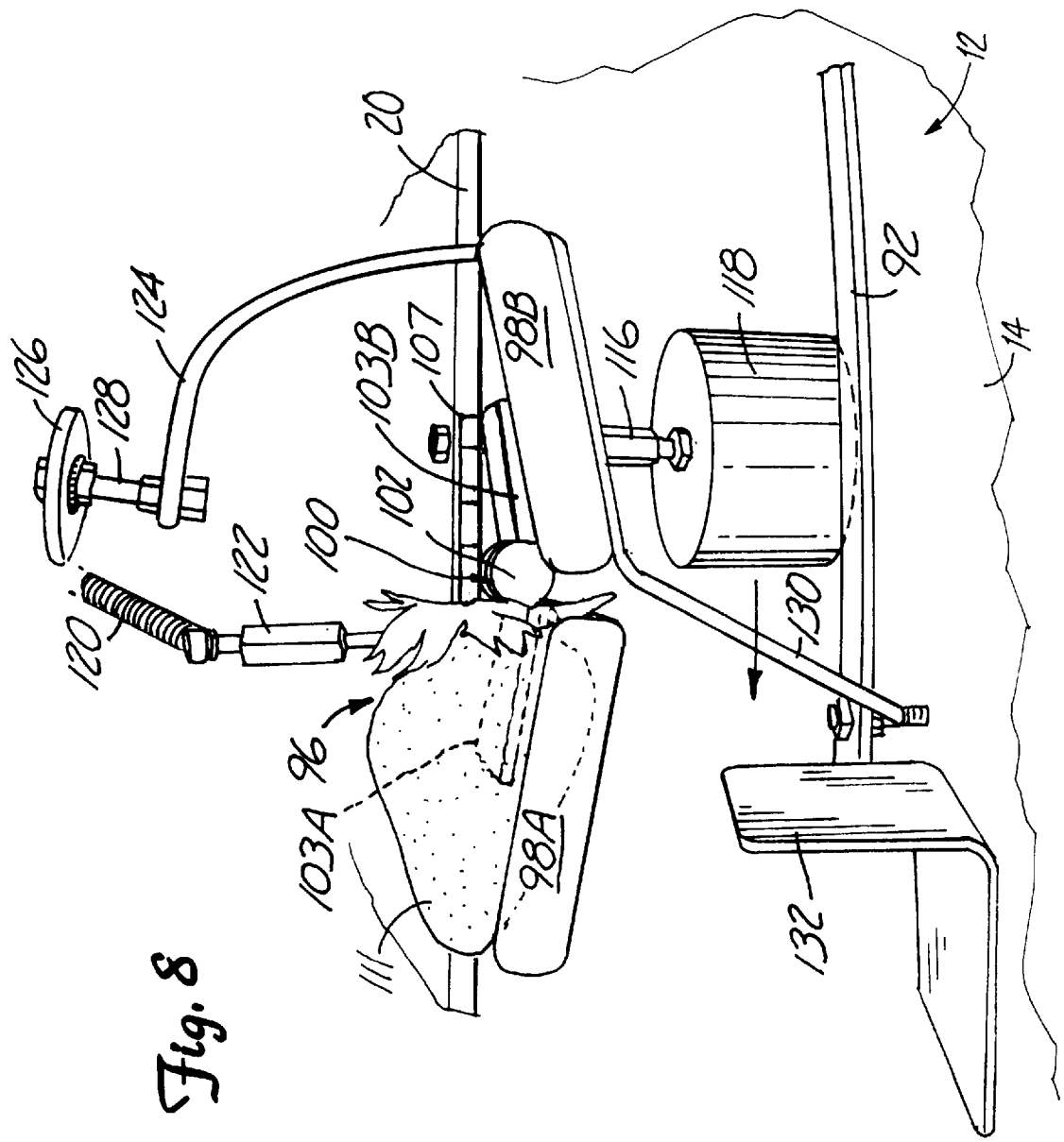
FIG. 8 is an end view of a berry retainer made according to the present invention just prior to closing the berry retainer onto a horizontally positioned berry.
Figure 9:
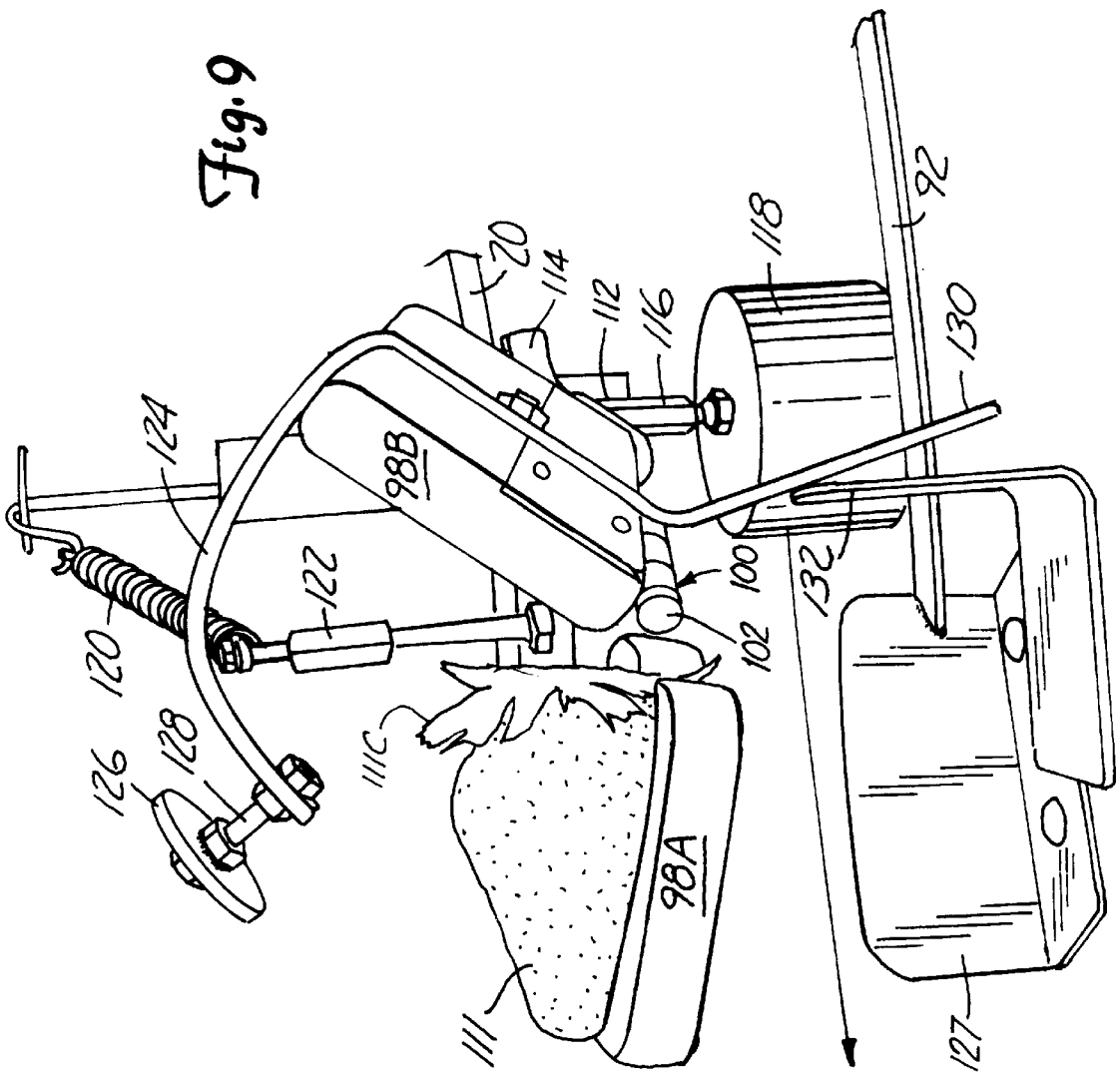
FIG. 9 is a view showing the berry retainer partially closed, through the use of a cam operator for folding the berry holder.
Figure 10:
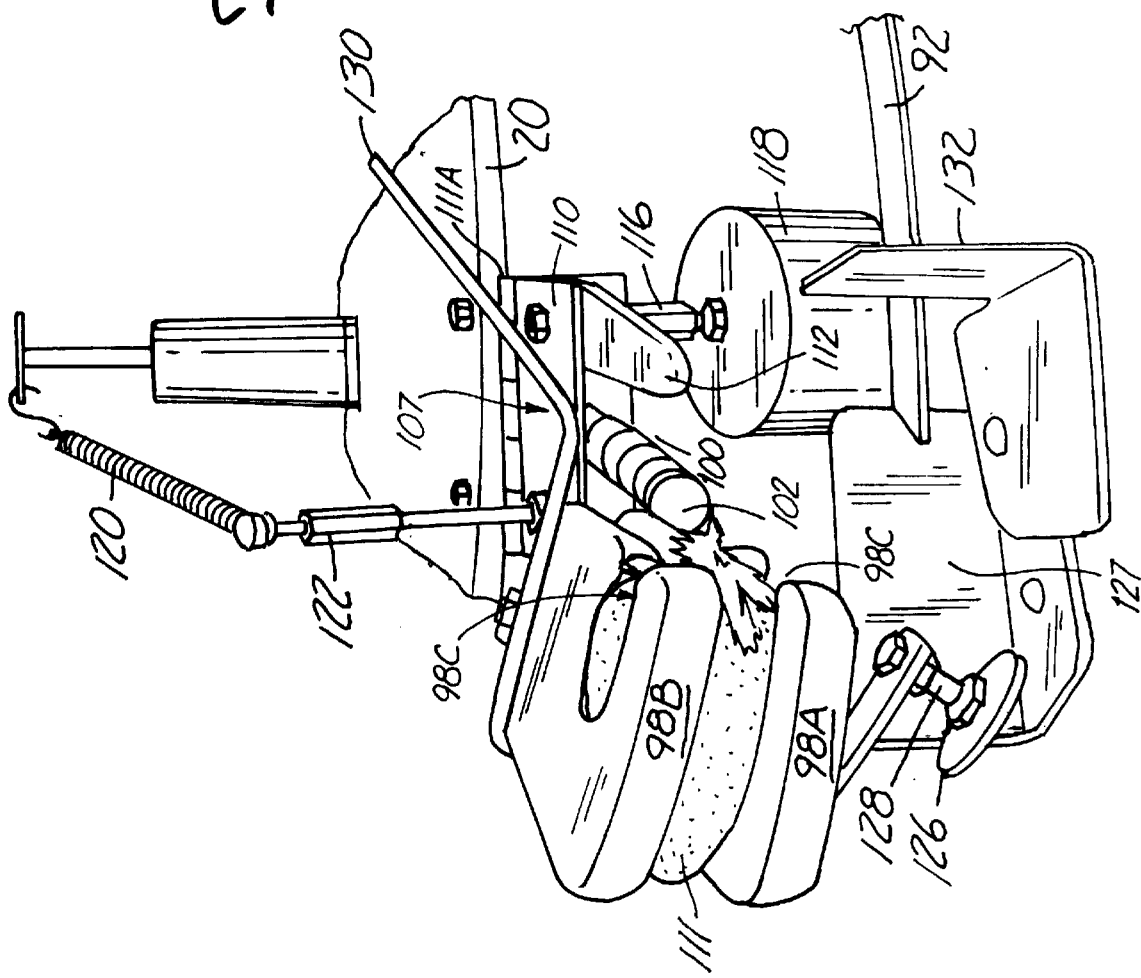
FIG. 10 is a view showing the berry holder holding the horizontally positioned berry under a counterweight action, and prior to orienting the berry holder to position the berry long axis vertically.

The folding of the berry retainer plates 98A and 98B is operated in this form of the invention by utilizing a cam which will cause the plate 98B to pivot relative to the plate 98A to cover a berry that is laying on its side or with its long axis generally horizontally. As shown in FIGS. 8 and 9, each berry retainer plate 98B has a counterweight support 124 bolted to its underside and curved upwardly to overlie the berry retainer plate 98B. A counterweight 126 is supported on a pin or shaft 128 on the portion of the counterweight support 124 overlying the plates 98A and 98B, and is oriented so that in an open position (FIG. 8) the counterweight will retain the plate 98B open as shown in FIG. 8 for example. The counterweight support 124 has a cam actuating tang or end portion 130 that is below the berry retainer plate 98B and a cam actuator bracket 132 is supported on the table 14, and thus is stationary relative to the berry holder which rotates with the carousel plate 20. As shown in FIG. 8, when the unit is approaching the open section of the cam 92, the tang 130 will be adjacent to and moving in a path aligning with the cam actuator bracket 132. As the cam roller associated with a particular berry retainer moves closer to the open segment of the cam track 92, but prior to that occurring, the bracket 132 will engage the tang 130 as shown in FIG. 9, causing the respective berry retainer plate 98B to start to fold about the hinge pin 102, on that hinge. The counter-weight 126 will be moved to a position where it will be on an opposite side of a vertical plane passing through the pin 102, generally as shown in FIG. 9, and as the carousel plate 20 continues to rotate, the tang 130 will cause the counterweight to move to the position as shown in FIG. 10. The berry retainer plate 98B will pass beyond the small end of the berry 111, to move to the position shown in FIG. 10 with the berry held in position between the plates 98A and 98B under the force from the counterweight 126. As shown in FIG. 10 the counter weight is directly below the berry retainer plate 98A.

Figure 11:
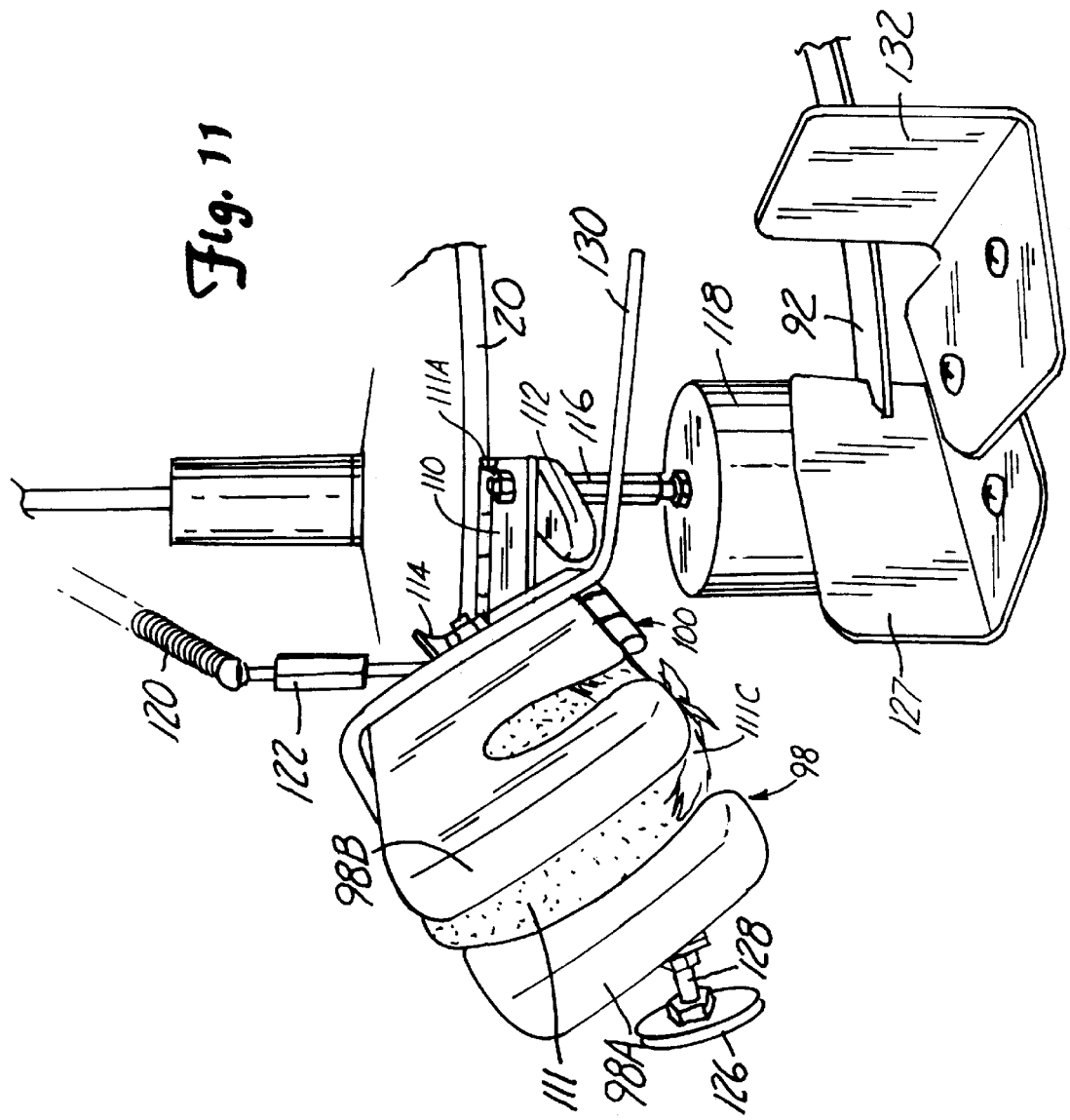
FIG. 11 is a fragmentary schematic view showing the actuator figures moving the closed berry retainer of the second form of the invention to position the berry vertically, and partially in position.

As the carousel plate 20 continues to move, the cam roller 118 will come into the open segment 94 of the cam track 92, and this open segment will permit the cam roller 118 to move along an exit guide 127 as shown in FIG. 11, to let the associated spring 120 act through the support arm 122 to lift the plate 110. Instead of closing the berry holder plates 98A and 98B, (which are already closed, as described) one of the fingers 112 will engage the cam follower 114 on the underside of the plate 98A in its horizontal position and move the plate 98A toward a vertical position as partially shown in FIG. 11. The plate 98A can have additional weight added to it, to insure that it will stay in its horizontal position until actuated by the fingers 112 and through the spring 120 and plate 110.

Figure 12:
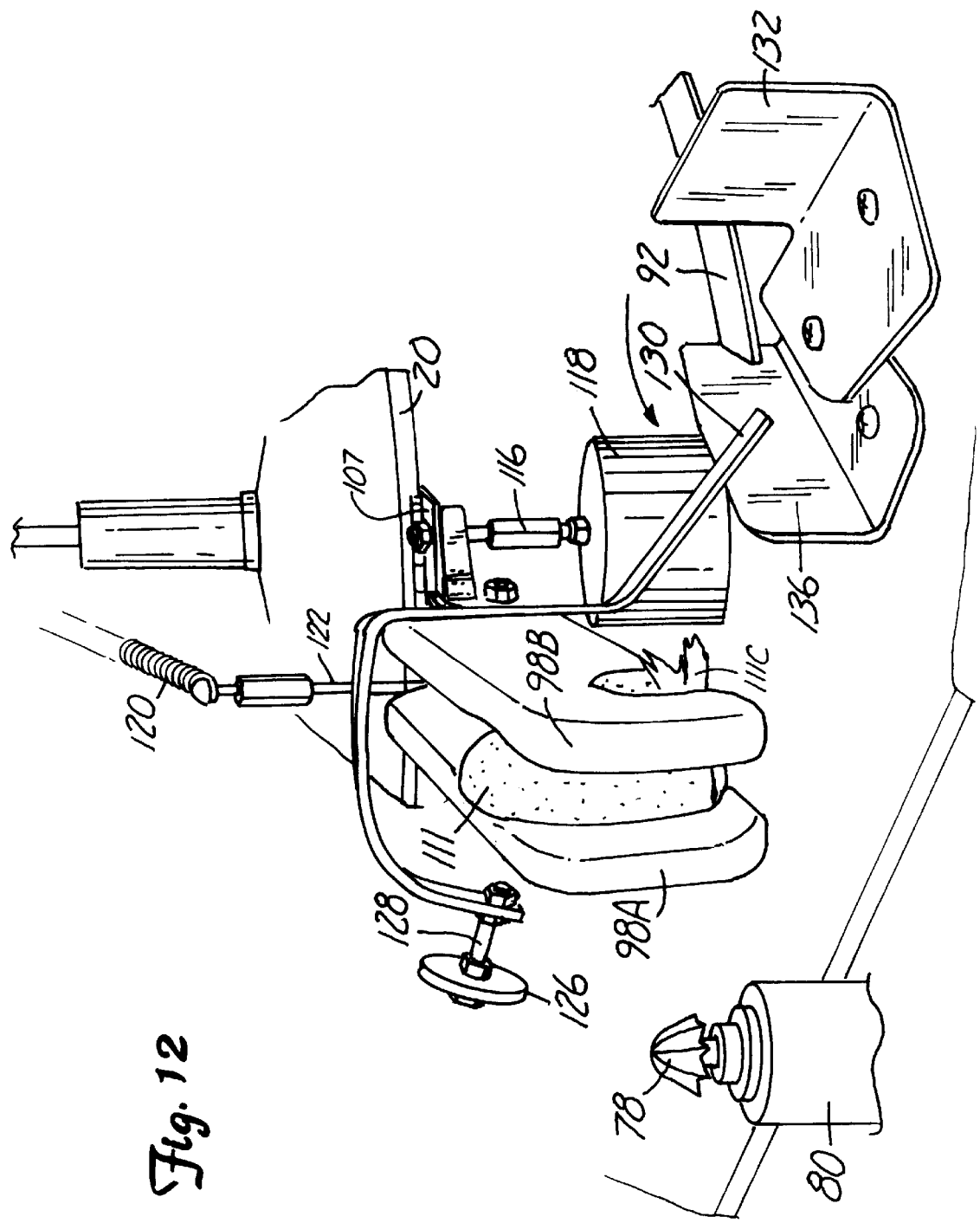
FIG. 12 is a schematic view of the berry retainer of the second form of the invention after being oriented vertically, and being held in place with actuator fingers, just prior to passing over the cutter for removing a hull.

There are fingers 112 on each side of the plate, following the cam followers 114 to hold the berry holder in position. As the cam roller 118 is completely released from the cam track 92 (in open segment 94), the berry retainer will be moved to a position as shown in FIG. 12 with the berry retainer 98 oriented such that the long axis of the berry shown at 111 will be vertical. The fingers 112 retain the berry retainer in that position. Then, the berry retainer sweeps past the motor 80 and cutter 78. Since the berry retainer plates 98A and 98B are provided with the same type of recess and opening 98C for holding the berries as in the first form of the invention, the cutter 78 will remove the hull or calyx 111C, which is protruding from the alining openings of the berry retainer plates.

Figure 13:
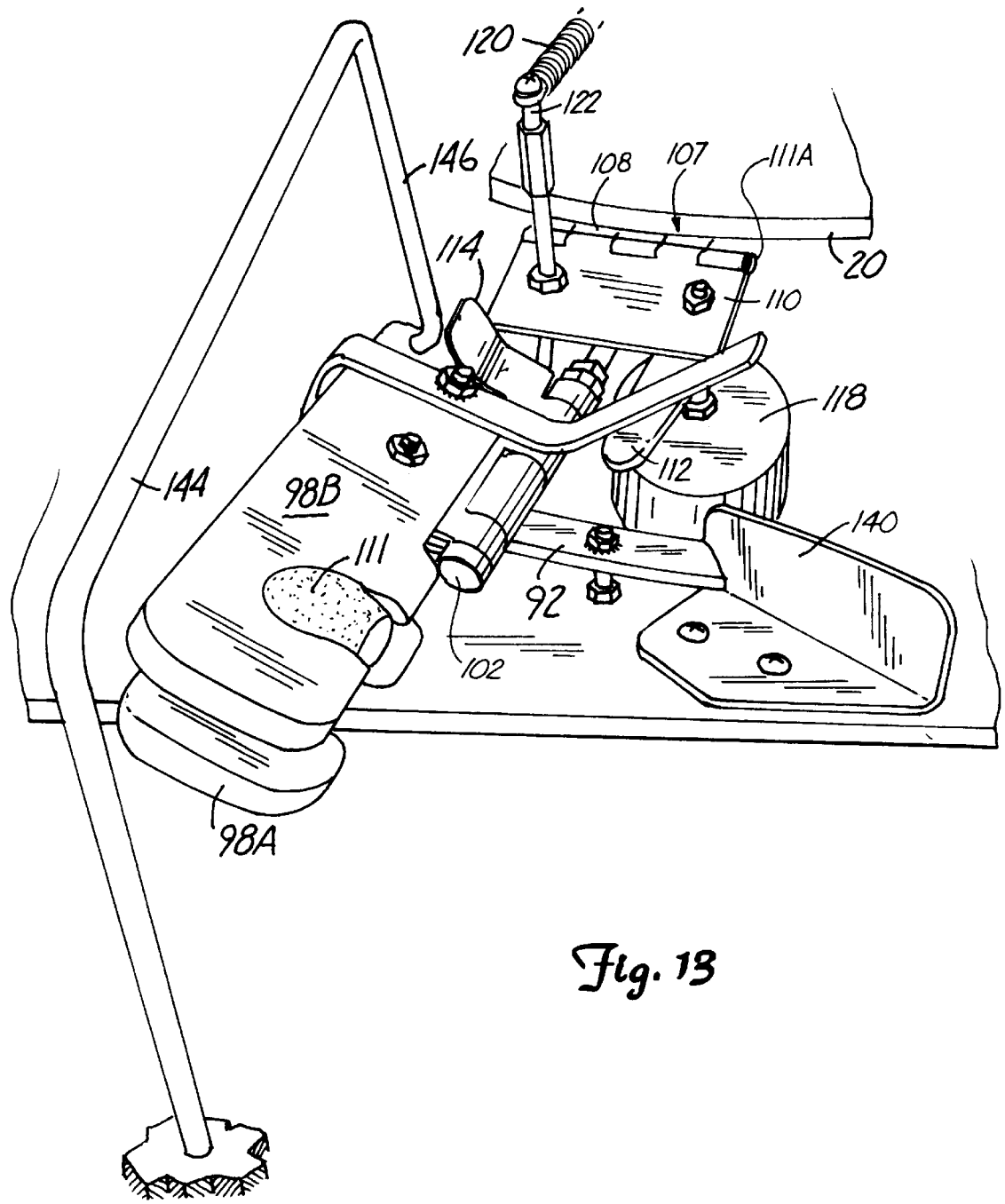
FIG. 13 is a schematic fragmentary schematic perspective view illustrating the berry retainer of the second form of the invention after passing over the cutter, with the berry still held in a horizontal position and a berry retainer opener to unfold the berry retainer of the second form of the invention.

When the carousel plate 20 has moved beyond the cutter 78, the cam roller 118 moves along an inlet guide 140 back into the cam track 92, as shown in FIG. 13, and this will release the fingers 112 from their position and move them downwardly where they no longer engage the cam arms 114 and permit the berry retainer 98 to move to its horizontal position as shown in FIG. 13, but with both of the berry retainer plates held together by load from the counterweight 126. The counterweight 126 will be below the horizontal plate as shown.

The lower plate 98A, moves to this position as the fingers 112 are released from the cam followers 114. A berry retainer opener arm 144 is supported on or relative to the table 14 in a suitable manner, and has an actuator end 146 that aligns with a small tang 148 carried by the follower arm 114 on the berry retainer plate 98B. As shown in FIG. 13 as the carousel plate 20 moves past actuator end 146, the berry retainer will be caused to open about the hinge pin 102 under the action of the stationary actuator 146 and the moving berry retainer 98.

Figure 14:
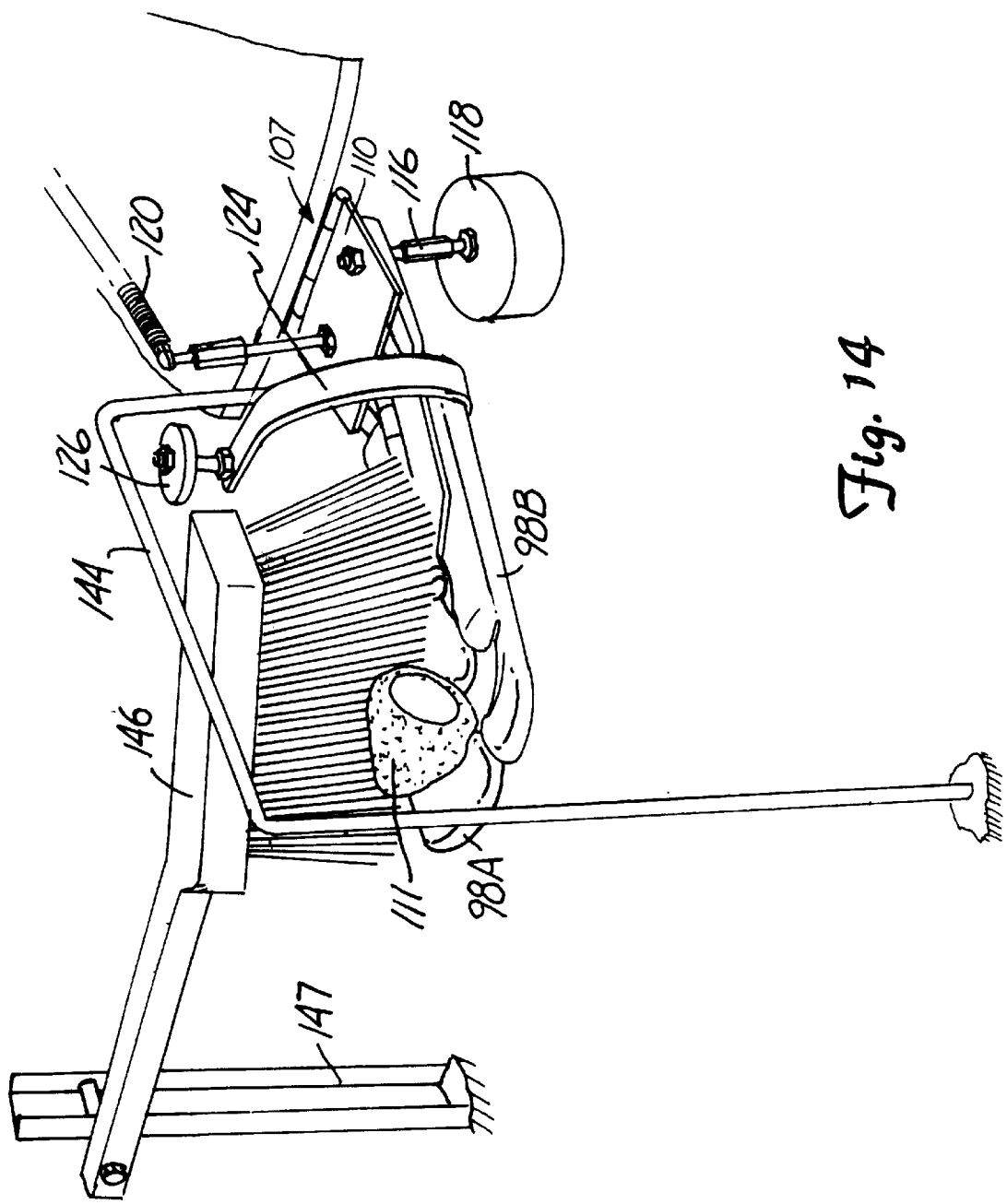
FIG. 14 is a schematic representation of the use of a brush from removing a berry from the retainer of the second form of the invention after the retainer has been opened.

When the berry holder 98 moves to its open position as shown in FIG. 14, past the actuator arm 144 and the end 146, a berry removal device will be present. In this form, a brush indicated at 146 mounted on a suitable support 147 relative to the table 14 will be positioned to brush over the tops of the open berry retainer plates 98A and 98B and move the berry 111 into a waiting receptacle. Once the berry is removed, another berry can be replaced on the berry retainer by an operator as previously stated. This will permit the operator or operators to do sorting. Placing the berries on their side is more stable for supporting the berries than placing them on the end as in the first form of the invention, although both forms will work. The second form of the invention tends to require less attention and less labor from the operator.

The cycle repeats as the carousel plate 20 rotates.

The speed of operation can be quite high because both hands of an operator can be used for loading berries or other fruits from which a hull, stem or calyx is to be removed. Two stations such as stations 30A and 30B can be loaded simultaneously by one operator, and two or more operators can work on one carousel. If desired sorting stations can be added so that at stations 30E and 30B, for example, berries can be replaced or added.

The dehulling operation is smooth, and quick, and the berries are held without damage.

While the cutter is illustrated as being stationary and the berry moved by the carousel plate 20, the relative movement can be achieved by moving the cutter past stationary berry holders that are manually or cam controlled. Further, the berry retainers can be moved and the cutter also mounted for movement. The berry retainers do not have to be rotating, but could also move in an endless path on a chain or the like.

It is also to be noted that the berry retainers can be moved, shifted or rotated relative to the carousel. For example, the berry can be laid on its side on a retainer, held in place and rotated so the hull or calyx was at the bottom for cutting.

What is claimed is:

1. A fruit handling apparatus comprising a support, a receiver mounted on the support for receiving a piece of fruit, said receiver including a retainer that will receive and engage surface portions of a piece of fruit and retain the piece of fruit on the receiver, and a processing station adjacent the support for performing a processing function on the fruit as the piece of fruit is retained by the receiver, the processing station and the support being relatively movable to perform the processing function, said retainer comprising a pair of members hingedly connected together about a hinge axis, said members hinging to grip and support the fruit with a portion of the piece of fruit being exposed, such that the hinging members hold the piece of fruit while the processing function is performed on the exposed portion of the piece of fruit.

2. The apparatus of claim 1, wherein said retainer comprises a receptacle for receiving a piece of fruit with a portion of the fruit exposed in an opening, the processing station comprising a cutter acting to remove at least part of the portion exposed.

3. The apparatus of claim 1, wherein said hinging members comprise a pair of folding plate members hingedly connected together about a hinge axis, said plate members each having a recess opening to an edge facing the other plate member adjacent the hinge axis, said piece of fruit being received in said recesses, such that the recess openings adjacent the edges of the plate members form a through opening to expose the portion of the piece of fruit when the plate members are folded to retain a piece of fruit.

4. The apparatus of claim 3, wherein the processing station comprises a cutter mounted adjacent the support for engaging a portion of the piece of fruit aligned with the through opening when the plate members are folded and retaining a piece of fruit.

5. The apparatus of claim 4, wherein said cutter comprises a high speed rotary cutter.

6. The apparatus of claim 4, wherein each said recess is shaped to receive a portion of a piece of fruit with a hull, the fruit protruding into the through opening formed by the plate members, said cutter engaging said hull.

7. The apparatus of claim 2, wherein said retainer comprises a pair of folding members hingedly connected together about a hinge axis, said folding members being formed such that the cutter can engage and pass across the portion of the piece of fruit as the cutter and support are relatively moved.

8. The apparatus of claim 7, wherein said support is movable relative to the cutter and the support comprises a rotating carousel having plurality of receivers thereon.

9. The apparatus of claim 8, wherein said folding members have actuator arms thereon extending laterally therefrom, and a cam for engaging at least one of said actuating arms for moving said folding members about the hinge axis at a selected location in the path of movement of the carousel.

10. The apparatus of claim 9, wherein the folding members are folded together about a hinge axis to retain a piece of fruit prior to the cam engaging the at least one actuator arm, the cam causing the plate members to both rotate substantially 90° about the hinge axis.

11. The apparatus of claim 1, wherein the support is movable in a path and moves relative to the processing station, and further comprising a spring providing the controlled force on the retainer for urging the retainer toward a position causing a cutter at the processing station to engage a piece of fruit on the retainer, and a cam member following a cam track for holding said retainer in a position for receiving a piece of fruit throughout a selected portion of the path of travel of the movable support, said cam track having a portion that releases the cam to permit the spring to move the retainer to engage a piece of fruit under the force of the spring.

12. A berry processing apparatus comprising a movable support moving in a closed path, a plurality of receivers mounted on the support at a respective plurality of stations, said receivers each comprising at least a first member for holding a berry with a portion of the berry unsupported and at least one second member pivoted to the first member and foldable to engage side portions of a berry placed on the first member and leaving the portion of the berry unsupported to retain the berry as the receiver moves with the movable support, and a cutter adjacent the movable support at a processing station for engaging and removing at least a portion of the unsupported portion of a berry held in each receiver as the berry moves past the cutter, the movable member subsequently being moved to release the berry.

13. The apparatus of claim 12, wherein the first member is a plate which has a receptacle for receiving a berry with the unsupported portion of a berry being adjacent an edge of plate member, and the processor comprises a member engaging and removing a part of the unsupported portion of such berry.

14. A berry processing apparatus comprising a movable support moving in a closed path, a plurality of receivers mounted on the support at a respective plurality of stations, said receivers each having a retainer member for receiving a berry to be processed and including at least one movable member movable to engage side portions of a berry placed on other portions of the retainer member and retain the berry as the receiver moves with the movable support, and a processor adjacent the movable support at a processing station for performing a processing function on a berry held in each retainer member as the berry is retained on the respective retainer member and moves past the processor, the movable member of the retainer member subsequently being moved to release the berry held thereby, the retainer member and the at least one movable member comprising a pair of folding members hingedly connected to each other about an axis, said folding members each having a recess opening to an edge thereof facing and aligning with the recess opening of the other folding member adjacent the hinging axis, a hull portion of the berry held by the retainer member being received in the recesses, the recess openings adjacent the edges of the folding members forming a through opening when the folding members are folded to retain a berry, and the processor acting on the portion exposed at the through opening.

15. The apparatus of claim 14, wherein the processor comprises a cutter for engaging the portion of the berry exposed at the through opening and for removing the hull portion of the berry.

16. The apparatus of claim 15, wherein the folding members are open and at least one folding member is generally horizontal in a first position of the movable member, an actuator operable as the movable member moves for folding a second of the folding members to overlie the one folding member and retain a berry between the folding members, the second folding member having a weight thereon which is positioned to provide the controlled force.

17. The apparatus of claim 15 wherein said movable member comprises a rotating carousel rotating about a central axis, the retainer members being spaced around the periphery of the carousel to form the plurality of stations.

18. The apparatus of claim 17 wherein said folding members of each receiver have actuator portions thereon, and a cam member for each receiver carried on the carousel for controlling movement of said folding members about the axis at a selected location in the path of movement of the folding members on the movable support, a cam track supported stationarily relative to the carousel, the cam members having cam followers on the cam track held in a first position by the cam track, the cam track having a portion permitting the cam members to move to a second position, a control actuator coupled to each the cam member, a bias force resisted by the cam members when the cam members are held in the first position, the portion permitting the cam member to move to a second position permitting the bias force to pivot both the folding members about the axis prior to a position of the carousel where the cutter engages the portion of the berry, the cutter engaging the berry held by the folded folding members after the folding members are permitted to pivot.

19. The apparatus of claim 16 and a cam control to rotate both folding members about the axis substantially 90° at a selected location in the closed path of the moveable member.

* * * * *